United States Patent [19]
MacDonald

[11] 3,747,425
[45] July 24, 1973

[54] TRANSFER CASE WITH STRAIGHT LINE SHIFTER

[75] Inventor: Richard A. MacDonald, Royal Oak, Mich.

[73] Assignee: General Motors Corporation, Detroit, Mich.

[22] Filed: Sept. 13, 1971

[21] Appl. No.: 179,950

[52] U.S. Cl. .................................................. 74/477
[51] Int. Cl. ......................... G05g 5/10, G05g 9/00
[58] Field of Search ..................... 74/475, 476, 477, 74/473 R

[56] References Cited
UNITED STATES PATENTS
3,529,487  9/1970  Dolan ................................. 74/477
3,552,227  1/1971  Schroeder et al ..................... 74/477

Primary Examiner—Milton Kaufman
Assistant Examiner—Frank H. McKenzie, Jr.
Attorney—W. E. Finken, C. R. White et al.

[57] ABSTRACT

Controls for transfer case gearing in which a manual lever is moved in a straight path to predetermined stations operating a pair of shift rods, connected by interlock pins and cam surfaces, to condition transfer case gearing for four wheel high, two wheel high, neutral and four wheel low drive.

5 Claims, 7 Drawing Figures

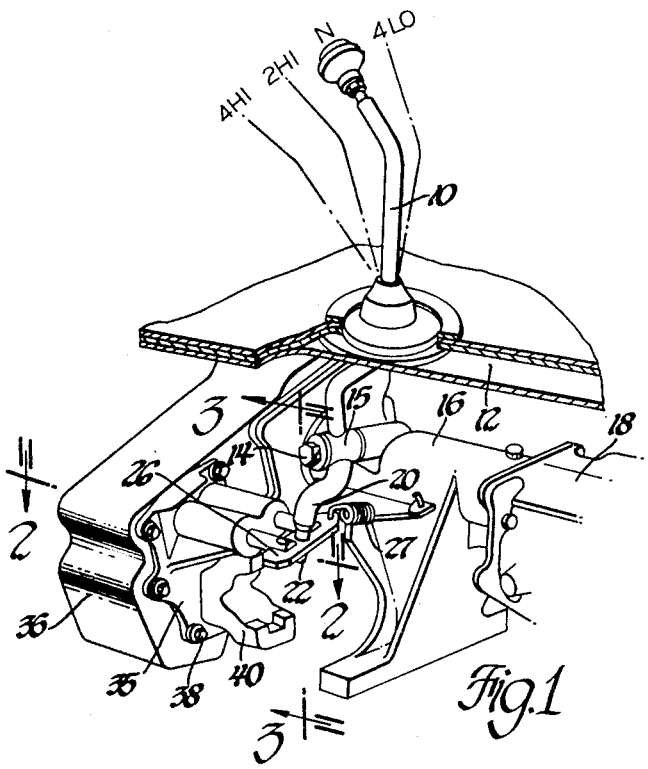
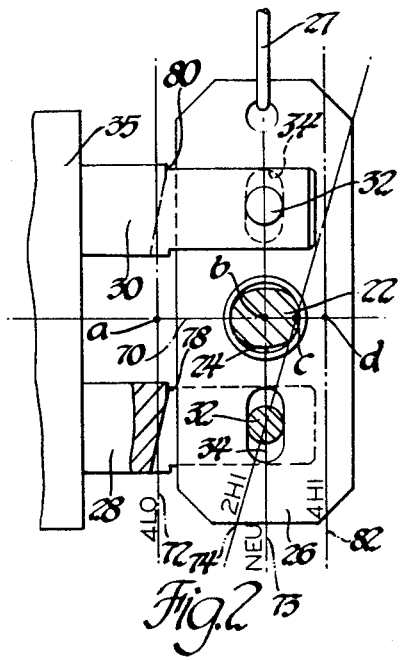
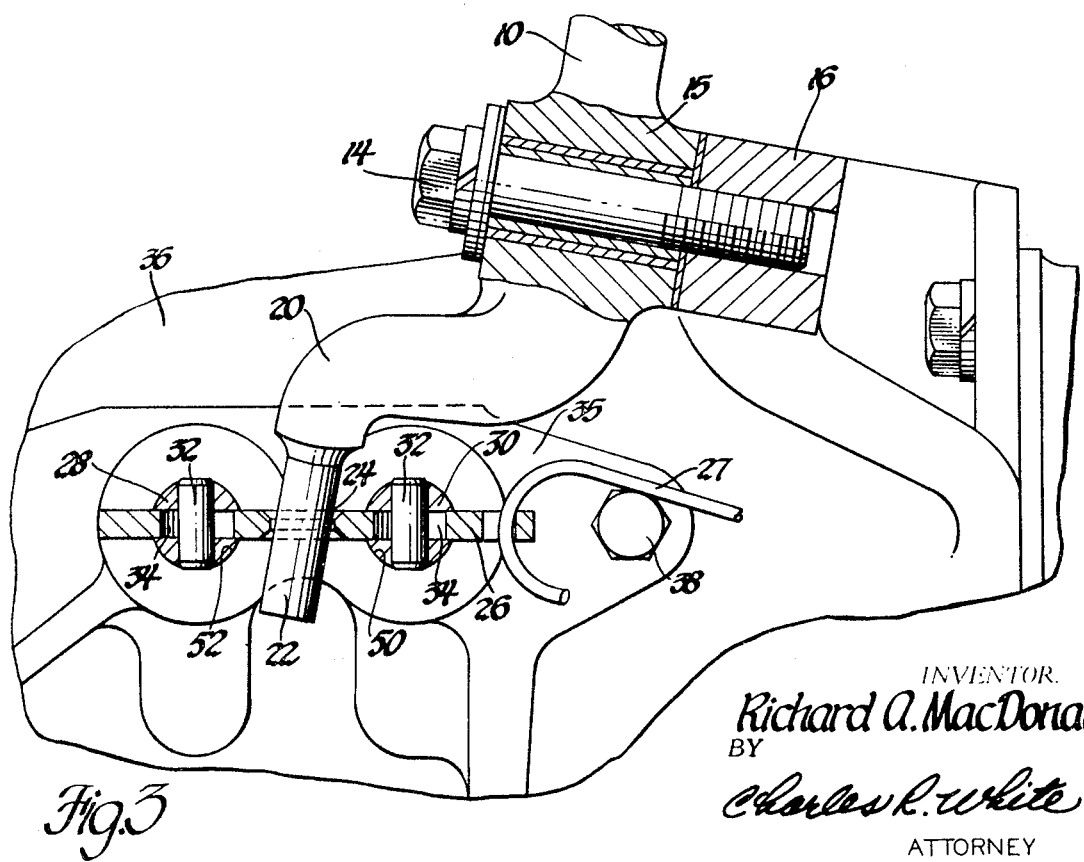
Fig.1
Fig.2
Fig.3
INVENTOR.
Richard A. MacDonald
BY
Charles R. White
ATTORNEY

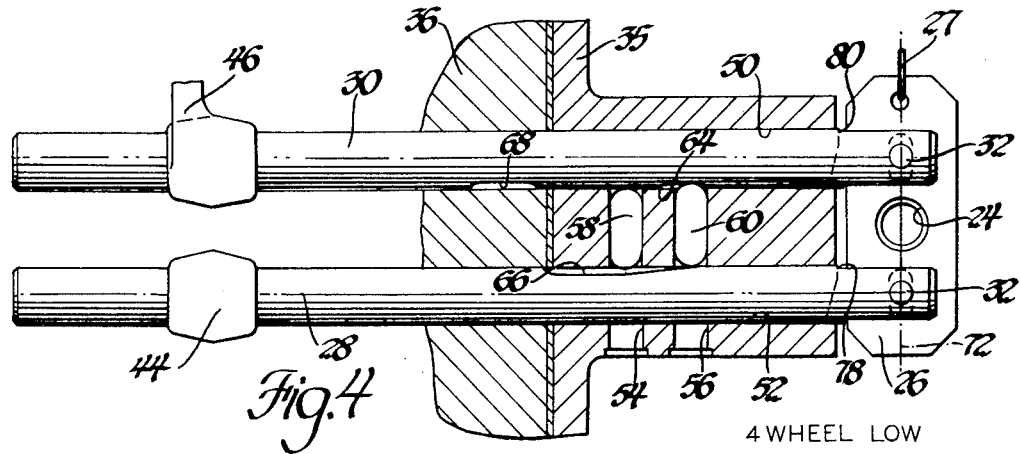
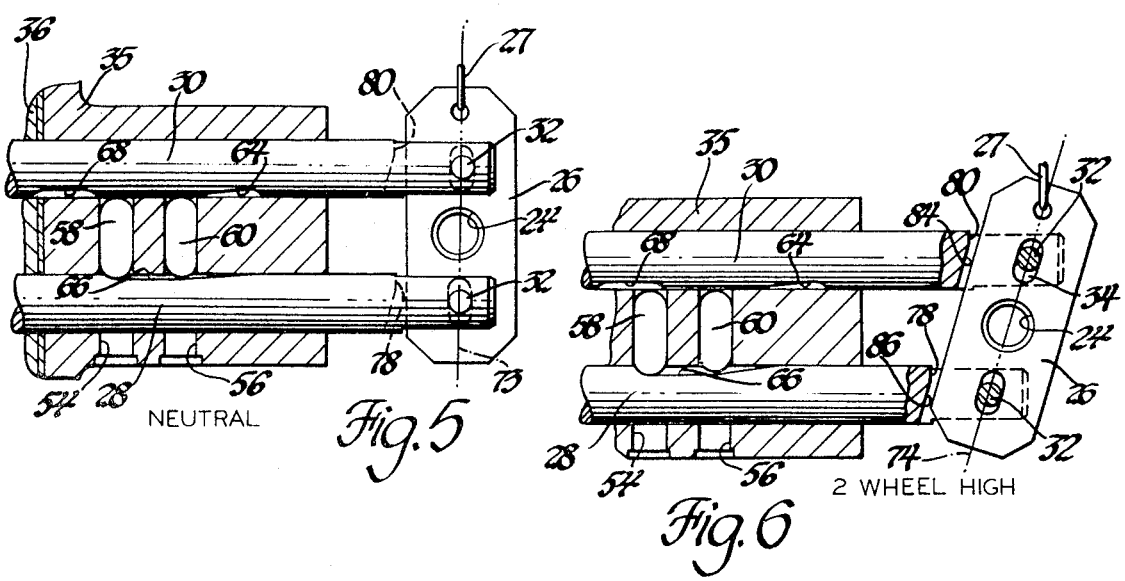
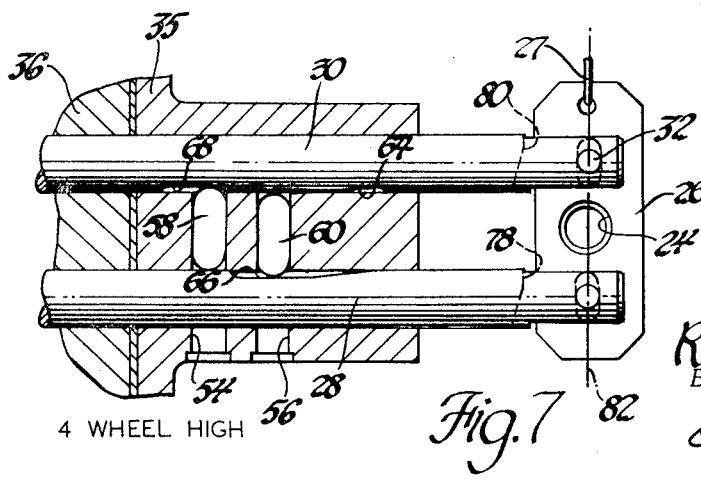

TRANSFER CASE WITH STRAIGHT LINE SHIFTER

This invention relates to power transmissions and more particularly to new and improved straight line shift controls for transfer case gearing.

Transfer gearing has been successfully employed for many years with forward and reverse drive transmissions to provide for selective two-wheel or four-wheel drive for many types of vehicles such as snow plows, wreckers, lift trucks, military vehicles, campers, and other recreational vehicles. Preferably, such transfer gearing has a single manual lever to reduce the number and complexity of control devices in the vehicle. Also, many controls have special auxiliary mechanisms to positively prevent the transfer gearing from being conditioned for two-wheel low so that extremely high torques will not be imposed upon the gear train and wheel drive components possibly detracting from their service life. Generally the prior controls have had staggered or irregular shift patterns or have had relatively complex constructions to provide for straight line shift patterns.

In this invention there is provided a new and improved shift control for transfer case gearing in which the lever is moved in a straight line within a plane. Provision is made for shifting between neutral, four-wheel high, two-wheel high and four-wheel low. This invention utilizes a pair of shift rods interconnected by a link member slidably and pivotally connected to an end portion of each rod and operated by a shift lever. The selective longitudinal movements of these shift rods is accomplished by manually moving the shift lever which acts through the link member to move the shift rods longitudinally. Interlock pin means cooperating with cam surfaces on the shift rails and special interlocking stop shoulders on the shift rods coacting with the link member provide for the simultaneous or independent movement of the shift rods to establish the various two-wheel and four-wheel drives. The interlock pin means and interlocking stop shoulders are advantageously employed to prevent a two-wheel front or rear low range drive so that drive train components will not be subjected to excessive torque.

It is an object and feature of this invention to provide a new and improved straight line shift control for transfer case gearing.

Another object and feature of this invention is to provide a shift control for gearing which has a straight line shift path for conditioning the gearing for predetermined drive ranges and which has new and improved interlock means for providing for shifts between two-wheel and four-wheel drive and which blocks a shift into two-wheel low.

Another object and feature of this invention is to provide a new and improved interlock mechanism for shift rods separately or jointly operated by a single control lever to provide for four-wheel low drive, four-wheel high, neutral, two-wheel high and which has stop shoulder means that cooperate with a lever connecting the rods to inhibit a shift into two-wheel low.

These and other objects, features and advantages of this invention will become more apparent from the following detailed drawing and description in which:

FIG. 1 is a perspective view of a portion of a vehicle showing a transfer case and control;

FIG. 2 is a view taken along line 2—2 of FIG. 1;

FIG. 3 is a view taken along lines 3—3 of FIG. 1; and

FIGS. 4 through 7 are top views of the shift rods of this invention illustrating the operation thereof.

Turning now to FIG. 1, there is a control lever 10 extending through an opening in the floor 12 of a vehicle which is mounted for limited pivotal movement about a pivot bolt 14 that extends through an enlarged hub portion 15 formed intermediate to the ends of the lever. This bolt is threadedly fastened into an adapter assembly 16 that is connected to the end of a transmission case 18 which has suitable forward and reverse drive gearing such as four-speed forward and one-speed reverse. As shown best in FIGS. 1 and 3, the lever 10 has a curved end portion 20 that terminates in a downward projecting finger 22 that extends with clearance through a circular opening 24 formed in a flat and laterally extending link 26 connected at one end thereof to the adapter assembly by an anti-rattle spring 27.

There are a pair of parallel shift rods 28 and 30 which have bifurcated ends into which the link 26 extends. The end of each rod is movably secured to the link 26 by a pin 32 that extends through a laterally extending and elongated opening 34 formed in the link on each side of circular opening 24 as best shown in FIGS. 2 and 3. The parallel shift rods 28 and 30 are axially shiftable in a support 35 secured to the transfer case 36 by bolts 38. The transfer case has any suitable transfer gearing such as that disclosed in U.S. Pat. No. 3,283,298 dated Nov. 1, 1966 having a splined input shaft operatively connected to the transmission output shaft and with front and rear wheel drive yokes.

In FIG. 1 there is a front wheel drive yoke 40 which may be connected to a propeller shaft operatively connected to the front wheels of a four-wheel drive vehicle. There is also a rear drive yoke being behind the transfer case in FIG. 1 and thus not shown that preferably is directly aligned with the adapter assembly and the transmission which is connected to the rear wheels of a vehicle through a propeller shaft.

The shift rod 28 controls power flow to the front wheels and extends longitudinally into the transfer case 36. This rod has a shift fork 44 fixed adjacent to one end thereof which is operatively connected to a front wheel drive and connecting gear of the transfer case gearing such as gear 80 disclosed in the patent referenced above. Rod 28 can be axially shifted to different stations to shift the reference gear 80 to provide for high speed, neutral, and low speed drive of the front wheels of the vehicle. The shift rod 30 controls the power flow from the transmission to the rear wheels and extends longitudinally into the transfer case 36 alongside of shift rod 28. There is a shift fork 46 near the end of shift rod 30 which is operatively connected to a rear wheel drive and connecting gear member of the transfer case gearing such as gear 44 in the above-cited patent. Longitudinal movement of shift rod 30 to predetermined stations moves the reference gear 44 to establsih high, neutral, and low speed drive of the rear wheels.

As shown best in FIGS. 4 through 7, the support 35 is formed with parallel bores 50 and 52 into which the shift rods 30 and 28 are slidably mounted. The support 35 has parallel openings 54 and 56 drilled therein at right angles to and intersecting with the bores 50 and 52 for the reception of two interlock pins 58 and 60. These pins cooperate with cam surfaces 64 and 66 formed in shift rods 30 and 28 respectively and with recess 68 formed in shift rod 30 between the cam surface 64 and the shift fork 44.

Referring in particular to FIG. 1 and FIG. 2, the finger 22 of shift lever 10 can be positioned by the operator at any one of a number of predetermined stations shown as points a, b, c and d along a straight line path 70 illustrated best by FIG. 2 to move the link 26 to operate shift rods 28 and 30 and change the drive through the transfer case 36. Assuming the shift lever is in the four-wheel low position, the finger 22 of lever 10 will be at point a and the longitudinal axis of the link 26 will be at the position 72 illustrated in FIG. 2. If the driver desires neutral, he will manually move lever 10 rearwardly in a straight line to exert a forward force directed by the finger 22 on the link 26 to simultaneously move the link 26 with the two rods 28 and 30 to the neutral position shown in FIGS. 2 and 5. The interlock pins 58 and 60 permit this simultaneous movement since there are urged laterally into the lower part of the cam surface 66 allowing the two shift rods to move to the neutral position shown in FIG. 5. This position is also represented by point b and link axis line 73 in FIG. 2. In this shifting operation the contact of pin 60 with rod 28 would prevent the movement of rod 30 ahead of rod 28 thus preventing front two wheel low. Contact between stop shoulder 78 formed on rod 28 and the rear edge of link 26 prevents movement of rod 28 ahead of rod 30 thus preventing rear two wheel low.

In shifting from neutral back to four wheel low, the shift rods will again be moved in unison from the FIG. 5 to the FIG. 4 position. Two wheel low cannot be obtained since pin 60 contacts rod 30 and the cam 66 would urge pin 60 into locking engagement with rod 30 to prevent rod 28 from moving ahead of rod 30. Furthermore, rod 30 cannot move ahead of rod 28 because stop shoulder 80 contacts the leading edge of plate 26 as it begins to turn counterclockwise with respect to pin 32.

From neutral, if the driver desires two-wheel high, the lever is moved in a straight line from the illustrated neutral position to the two-wheel high position shown best by FIG. 1. When this occurs, the interlock pin 58 contacting the end surface of cam 66 locks forward movement of the front wheel shift rod 28 so that only the rear wheel shift rod 30 moves to the high range position, allowing the transfer case gearing to direct power to the rear wheels with no increase in torque from the transmission. The link 26 assumes the canted position shown in FIG. 6 and illustrated as line 74 in FIG. 2. Rods 28 and 30 have inclined relieved portions 84 and 86 in their end areas adjacent to shoulder 78 and 80 to permit this movement without interference. From two wheel high to neutral the interlock pin 60 contacting rod 30 and operating on cam surface 66 holds rod 28 in position and allows rod 30 to be axially moved to the position shown in FIG. 5. From the two wheel high position, point c, the shift lever can be moved in a straight line rearwardly to the four-wheel high position, since the low points in cam surface 66 allow forward movement of rod 28 when plate 26 experiences a turning movement about pin 32 secured to rod 30. When the rod 28, controlling the front wheel drive, is moved from its neutralized position in FIG. 6 to the high range position in FIG. 7, the interlock pin 58 is cammed into the recess 68. The axis of link 26 is shifted to line 82 in FIG. 2. In downshifting from four wheel high to two wheel high the end of recess 68 contacts pin 58 to hold rod 30 as the plate turns counterclockwise under the urging from lever 10 to shift rod 28 to the neutral position. Since two wheel low cannot be obtained with this construction, the excess torquing of the drive components to the rear wheels is eliminated.

While a preferred embodiment of this invention has been shown and described, other embodiments will be apparent to those skilled in the art. This invention is thus not limited to the particular construction shown and described but by the following claims:

I claim:

1. In a transfer case in a vehicle having front and rear wheels for selectively providing two and four wheel drive, shift lever means supported for limited rotary movement only in a single plane, a pair of shift rods extending into said transfer case, link means operatively connected to said shift lever means, pin and slot means pivotally and slidably connecting said link to each of said rods, connector means operatively connecting a first of said shift rods to the transfer case gearing so that said first rod can control the power flow through said transfer case to the rear wheels of the vehicle, connector means operatively connecting a second of said shift rods to the transfer case gearing so that said second rod can control the power flow through said transfer case to said front wheels of the vehicle, and interlock means comprising a shoulder formed within each of said rods and inwardly of said link means for contacting said link means and comprising a pair of interlock pins operatively disposed between the shift rods and elongated recess in one of said rods and cooperating cam surfaces on said rods which cooperate with said pins to permit the rods to be positioned by movement of said lever means in said plane at a four wheel low position, a neutral position, a two wheel high position and a four wheel high position and further which inhibits the positioning of said rods at a two wheel low position.

2. In a vehicle having front and rear drive wheels and having gearing means for providing two or four wheel drive, a shift lever, support means mounting said shift lever for limited rotary movement in a plane to predetermined positions to condition said transmission for two wheel high range drive, four wheel high range drive, neutral, and four wheel low range drive, a link member having a straight inner edge portion, connector means connecting said link member to said shift lever, a first shift rod operatively connected to said link member and to said transmission for controlling the power flow into the rear drive wheels, a second shift rod operatively connected to said link member and to said transmission for controlling the power flow into the front drive wheels, sliding pivot connector means mounting said link member for limited turning movement in a first direction on each of said rods, and contact shoulder means formed within each of said rods and adjacent to said link member for contact with the straight inner edge portion when said link member is turned in an opposite direction so that one rod will not be moved ahead of the other, and interlock means comprising a pair of interlock pins disposed between said shift rods and opposing cam surfaces on said rods to permit said rods to be shifted together by movement of said shift lever in said plane between four wheel low and neutral position and which holds said second rod in said neutral position as said lever turns said link member to position said first rod at a predetermined position conditioning said transmission for two wheel high range drive.

3. In a vehicle having selectively powered front and rear drive wheels and having a geared transmission in a transfer case operatively connected to said drive wheels for providing low speed ratio, high speed ratio and neutral, a shift lever, support means mounting said shift lever for limited rotary movement in a plane to predetermined positions to condition said transmission for two wheel high range drive, four wheel high range drive, neutral, and four wheel low range drive, an elongated link member having a straight inner edge portion, connector means operatively connecting said link member intermediate its ends to an end portion of said shift lever, a first shift rod mounted for axial movement in said transfer case operatively connected to said transmission for controlling the power flow into the rear drive wheels, first pin and slot means slidably and pivotally connecting one end portion of said link member to said first shift rod, a second shift rod mounted for axial movement in said transfer case and operatively connected to said transmission for controlling the power flow into the front drive wheels, second pin and slot means slidably and pivotally connecting the other end portion of said link member to said second shift rod, interlock means comprising a pair of interlock pins disposed between said shift rods and opposing cam surfaces on said shift rods for connecting the ends of said pins to permit said rods to be shifted between four-wheel low and neutral and which holds said second rod in said neutral position as said lever turns said link member to position said first rod at a predetermined position conditioning said transmission for two wheel high drive range, recess means in one of said rods for receiving the end of one of said pins to permit said second rod to be moved by said lever from a neutral position to a position in which the front wheels are driven at a high speed ratio, and shoulder means formed in each of said rods adjacent to said inner edge portion of said link member for contact therewith to limit the sliding pivotal movement of said link member relative to said rods in one direction to prevent said second rod from moving ahead of said first rod in shifting from four-wheel low to neutral and to prevent said first rod from moving ahead of said second rod in shifting from neutral to four-wheel low.

4. A transfer case for a vehicle having front and rear drive wheels for selectively providing two or four wheel drive comprising a shift control lever, support means mounting said shift control lever for limited turning movement in a straight line pattern to different predetermined stations to condition the gearing in said transfer case for any one of a plurality of different drive modes, first shift rod extending into said transfer case having connector means operatively connected to the gearing in said transfer case and being longitudinally movable therein for conditioning the rear wheels for low range drive, neutral and high range drive, second shift rod means extending into said transfer case having connector means operatively connected to the gearing in said transfer case and being longitudinally movable therein for conditioning the front wheels for low range drive, neutral, and high range drive, a link member having a straight inner edge portion operatively connected to said control lever and slidably and pivotally connected to the ends of said shift rods so that said lever can be employed to move said rods longitudinally, and a stop shoulder on each of said rods and inwardly of said inner edge portion of said link member to contact and limit the turning movement of said link member to prevent one of said rods to be moved ahead of another, and interlock means comprising a pair of interlock pins operatively disposed between said shift rods and comprising opposing cam surfaces on said shift rod which cooperates with said interlock pins to permit said shift rods to be shifted simultaneously by said lever between four wheel drive and neutral and which inhibits movement of said second rod when said lever moves said first rod to said two wheel high position and recess means in said first rod to receive one of said interlock pins allowing said second rod to be shifted to a position in which power is directed to said front wheels as well as said rear to provide a four wheel high position.

5. The transfer case defined in claim 4 and further comprising pin and slot means for slidably and pivotally connecting the ends of each of said rods to said link member to permit said control lever to exert a turning force on said link to thereby turn said link with respect to one of said pins to shift one of said rods longitudinally as the other is being held by at least one of said interlock pins.

* * * * *